(12) United States Patent
Murakami

(10) Patent No.: US 10,364,710 B2
(45) Date of Patent: Jul. 30, 2019

(54) ENGINE VALVE AND METHOD OF PRODUCING THE SAME

(71) Applicant: HONDA MOTOR CO., LTD., Tokyo (JP)

(72) Inventor: Takafumi Murakami, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/464,790

(22) Filed: Mar. 21, 2017

(65) Prior Publication Data
US 2017/0276032 A1 Sep. 28, 2017

(30) Foreign Application Priority Data
Mar. 24, 2016 (JP) .................. 2016-060490

(51) Int. Cl.
| | | |
|---|---|---|
| F01L 3/20 | (2006.01) | |
| F16K 1/36 | (2006.01) | |
| F01L 3/02 | (2006.01) | |
| B21K 1/22 | (2006.01) | |
| B21C 23/18 | (2006.01) | |

(52) U.S. Cl.
CPC .............. *F01L 3/20* (2013.01); *B21C 23/183* (2013.01); *B21K 1/22* (2013.01); *F01L 3/02* (2013.01); *F16K 1/36* (2013.01); *F01L 2101/00* (2013.01); *F01L 2103/00* (2013.01); *F01L 2103/01* (2013.01)

(58) Field of Classification Search
CPC ...... F01L 3/20; F01L 5/24; F16K 1/36; F16K 1/32

USPC ....................................................... 123/188.3
See application file for complete search history.

(56) References Cited

U.S. PATENT DOCUMENTS

| | | | | |
|---|---|---|---|---|
| 2,070,102 A | * | 2/1937 | Weslake | F01L 3/14 123/188.3 |
| 2,093,774 A | | 9/1937 | Colwell | |
| 2,627,259 A | * | 2/1953 | Wood | F01L 3/04 123/188.3 |
| 3,073,294 A | * | 1/1963 | Brown | F01L 3/02 123/188.3 |

(Continued)

FOREIGN PATENT DOCUMENTS

| | | |
|---|---|---|
| JP | 60-034725 | 10/1985 |
| JP | 63-109202 A | 5/1988 |
| JP | 63-177603 U | 11/1988 |

(Continued)

OTHER PUBLICATIONS

Japanese Office Action dated Feb. 6, 2018 with English Machine Translation, 7 pages.

*Primary Examiner* — George C Jin
(74) *Attorney, Agent, or Firm* — Rankin, Hill & Clark LLP

(57) ABSTRACT

An engine valve and a method of producing the engine valve are provided. The engine valve includes a shaft part and an umbrella part formed at one end of the shaft part. The engine valve opens and closes an intake port or an exhaust port of a combustion chamber of an internal combustion engine. Further, at least a portion of the engine valve that extends from the umbrella part to a position on the shaft part in a longitudinal direction thereof includes a valve body made of steel or nickel alloy, and a core member made of copper or copper alloy and provided inside the valve body.

3 Claims, 5 Drawing Sheets

(56) References Cited

U.S. PATENT DOCUMENTS 3,391,444 A * 7/1968 Haller ..................... B22F 7/06
228/126

FOREIGN PATENT DOCUMENTS

| | | |
|---|---|---|
| JP | 04-069495 | 3/1992 |
| JP | 04-269312 A | 9/1992 |
| JP | 04-069495 | 11/1992 |
| JP | 2012-097627 | 5/2012 |

* cited by examiner

ENGINE VALVE AND METHOD OF PRODUCING THE SAME

CROSS-REFERENCE TO RELATED APPLICATION

This application is based upon and claims the benefit of priority from Japanese Patent Application No. 2016-060490 filed on Mar. 24, 2016, the contents of which are incorporated herein by reference.

BACKGROUND OF THE INVENTION

Field of the Invention

The present invention relates to an engine valve for opening/closing an intake port or an exhaust port of a combustion chamber of an internal combustion engine, and further relates to a method of producing such an engine valve.

Description of the Related Art

In order to increase the rotation speed of an engine, it is essential to increase the response speed of an engine valve responsive to rotation of a cam by reducing the weight of the engine valve. Further, in the case where the output of the engine is increased, since the combustion temperature is increased, if the heat radiation performance of the engine valve is poor, the engine valve may be heated to a temperature beyond the heat resistant temperature. Therefore, in the case where the engine valve is used for the internal combustion engine which requires high speed rotation and high output, the engine valve needs to be excellent in lightweight property, and have sufficient heat radiation performance or heat resistance performance.

In this regard, Japanese Patent Publication No. 04-069495 proposes an engine valve including a hollow valve body and a core member loaded inside the valve body. The valve body is made of steel, and the core member is made of titanium or titanium alloy which has good heat resistance performance, and has a specific gravity smaller than that of steel. Therefore, in this engine valve, in comparison with the engine valve having a solid valve body (made of only steel), it is possible to achieve weight reduction without degrading the heat resistance performance.

Further, Japanese Utility Model Publication No. 60-034725 proposes an engine valve where a core member made of any of aluminum, aluminum alloy, magnesium, and magnesium alloy is loaded inside the valve body. Japanese Laid-Open Patent Publication No. 2012-097627 proposes an engine valve where metal sodium is sealed inside the valve body. In the engine valves described in Japanese Utility Model Publication No. 60-034725 and Japanese Laid-Open Patent Publication No. 2012-097627, metal having a small specific gravity and a large heat conductivity in comparison with steel is provided inside the valve body. Therefore, it is possible to achieve weight reduction and improve heat radiation performance in comparison with the engine valve having the solid valve body.

SUMMARY OF THE INVENTION

In recent years, internal combustion engines which utilize a supercharger to have a reduced engine displacement (downsized internal combustion engine), aimed to achieve both of high output and improved fuel economy, have been drawing attentions. In such an internal combustion engine, in general, improvement of the torque is designed in the low speed rotation zone rather than the high speed rotation zone. High speed rotation is not required very much. On the other hand, since the combustion chamber tends to be hot by supercharging, it is required to suppress occurrence of knocking or the like due to preignition by positively radiating heat in the combustion chamber through the engine valve. Therefore, in the engine valve used in the downsized internal combustion engine, it is important to improve heat radiation performance rather than weight reduction.

However, the engine valves described in Japanese Patent Publication No. 04-069495, Japanese Utility Model Publication No. 60-034725 and Japanese Laid-Open Patent Publication No. 2012-097627 are mainly aimed at achieving weight reduction. Even if the core member made of any of the above metals is provided, there is a concern that sufficient heat radiation performance for the engine valve used in the downsized internal combustion engine may not be obtained. In particular, in the engine valve described in Japanese Patent Publication No. 04-069495, since the heat conductivity of titanium and titanium alloy used for the core member is not particularly large in comparison with steel used for the valve body, it is difficult to improve the heat radiation performance.

Further, in the engine valve described in Japanese Utility Model Publication No. 60-034725, since it is hard to say that the ductility of the core member made of aluminum, magnesium or the like is sufficient, it is difficult to mold the core member and the valve body integrally by extrusion, etc. In this case, for obtaining the engine valve, complicated steps such as loading of the core member into the valve body formed beforehand into a hollow shape by precision cutting or the like are required. Consequently, the production efficiency may be degraded, and the production cost may be increased undesirably.

Further, in the engine valve described in Japanese Laid-Open Patent Publication No. 2012-097627, since handling of sodium, which is a water-reactive substance, is difficult, decrease in the production efficiency and increase in the production cost are inevitable. Further, handling at the time of disposal of the used engine valve is difficult.

A main object of the present invention is to provide an engine valve in which it is possible to improve the heat radiation performance effectively, and produce the engine valve efficiently at low cost.

Another object of the present invention is to provide a method of producing the above engine valve.

According to an embodiment of the present invention, an engine valve for opening and closing an intake port or an exhaust port of a combustion chamber of an internal combustion engine is provided. The engine valve includes a shaft part and an umbrella part formed at one end of the shaft part. At least a portion of the engine valve that extends from the umbrella part to a position on the shaft part in a longitudinal direction thereof includes a valve body made of steel or nickel alloy, and a core member made of copper or copper alloy and provided inside the valve body.

The engine valve according to the present invention includes the core member made of copper or copper alloy inside the valve body made of steel or nickel alloy. The heat conductivity of the copper of copper alloy is larger than that of any one of steel, nickel alloy, titanium, aluminum, magnesium, and sodium. By providing the core member made of material having such a large heat conductivity, it is possible to improve the heat radiation performance of the engine valve effectively. Therefore, for example, the engine valve can be suitably applied to an internal combustion engine where an engine displacement thereof is reduced by utilizing a supercharger (downsized internal combustion engine). In this case, even if the combustion chamber tends to be hot due to supercharging, since the heat in the combustion chamber can be transmitted and radiated to the outside of the combustion chamber quickly through the engine valve, it is possible to effectively suppress knocking or the like in the internal combustion engine due to preignition.

Further, the core member is made of copper or copper alloy having ductility higher than that of aluminum, magnesium, etc. Therefore, it becomes easy to integrally mold the valve body and the core member by extrusion molding or the like for thereby obtaining the engine valve. Further, unlike sodium, etc., copper or copper alloy can be handled easily. In comparison with the engine valve having the core member made of aluminum, magnesium, sodium, etc., it is possible to produce the engine valve of the present invention efficiently at low cost. Further, handling at the time of disposal of the used engine valve is easy.

In the engine valve, preferably, a gap is formed at least in part between the valve body and the core member at temperature lower than the operating temperature of the internal combustion engine, and the valve body and the core member is in close contact with each other due to thermal expansion at the operating temperature or more.

The coefficient of thermal expansion of copper or copper alloy is larger than the coefficient of thermal expansion of steel or nickel alloy. Therefore, the degree to which the core member is thermally expanded as a result of the ambient temperature rising from the temperature before operation of the internal combustion engine to the operating temperature thereof is larger than the degree to which the valve body is thermally expanded as a result of the ambient temperature rising likewise. Therefore, by setting the dimensions of the valve body and the core member in a manner that the valve body and the core member contact each other tightly at the operating temperature of the internal combustion engine, a gap is formed at least in part between the valve body and the core member at temperature lower than the operating temperature of the internal combustion engine.

That is, in this engine valve, before the temperature of the internal combustion engine reaches the operating temperature thereof, since a heat insulating portion is formed between the valve body and the core member by the air in the gap, it is possible to decrease heat radiation from the engine valve. In the structure, radiation of the heat from the combustion chamber through the engine valve is suppressed, and it is possible to raise the temperature of the internal combustion engine to the operating temperature quickly.

On the other hand, after the temperature of the internal combustion engine reaches the operating temperature, since good heat transmission is established between the valve body and the core member which contact each other tightly, it is possible to increase heat radiation from the engine valve. Thus, heat in the combustion chamber can be radiated effectively through the engine valve, and further increase in the temperature can be suppressed.

As described above, since it is possible to change heat transmission in the engine valve depending on the temperature of the internal combustion engine, it is possible to improve the performance of starting operation of the internal combustion engine, and suppress knocking, etc. due to preignition.

Further, according to another embodiment of the present invention, a method of producing an engine valve for opening and closing an intake port or an exhaust port of a combustion chamber of an internal combustion engine is provided. The engine valve includes a shaft part and an umbrella part formed at one end of the shaft part. The method includes a billet forming step of forming a billet by loading the inside of first material of steel or nickel alloy with second material of copper or copper alloy, a shaft part forming step of extruding the billet in a warm temperature range or a hot temperature range at a temperature equal to or higher than the operating temperature of the internal combustion engine to thereby form the shaft part where a core member made of the second material is provided inside a valve body made of the first material, and an umbrella part forming step of plastically deforming a portion of the billet other than the shaft part to thereby form the umbrella part where the core member is provided inside the valve body.

In the production method according to the present invention, it is possible to easily perform integral molding on the billet made up of the first material and the second material to thereby produce the engine valve with excellent heat radiation performance where the core member made of copper or copper alloy is provided inside the valve body made of steel or nickel alloy. Therefore, it is not required to perform laborious steps, such as loading the core member into the valve body formed beforehand into a hollow shape by precision cutting, etc. Further, there is no need to handle water-reactive substance such as sodium. Therefore, it becomes possible to improve the production efficiency of the engine valve, and reduce the production cost.

Further, in the production method, as described above, the billet is extruded in the warm temperature range or the hot temperature range at a temperature equal to or higher than the operating temperature of the internal combustion engine to form the shaft part, and thereafter, a portion of the billet other than the shaft part is plastically deformed to form the umbrella part. In the engine valve obtained in the above manner, since the dimensions of the valve body and the core member are set in a manner that the valve body and the core member is in close contact with each other at the temperature corresponding to the operating temperature of the internal combustion engine, a gap is formed at least in part between the valve body and the core member at temperature lower than the operating temperature. Therefore, it is possible to obtain the engine valve capable of adjusting the quantity of heat radiation in accordance with the temperature of the internal combustion engine in a manner to improve the performance of starting operation of the internal combustion engine, and suppress knocking, etc. due to preignition.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of an engine valve according to the present invention will be described in connection with its production method with reference to the accompanying drawings.

Figure 1:
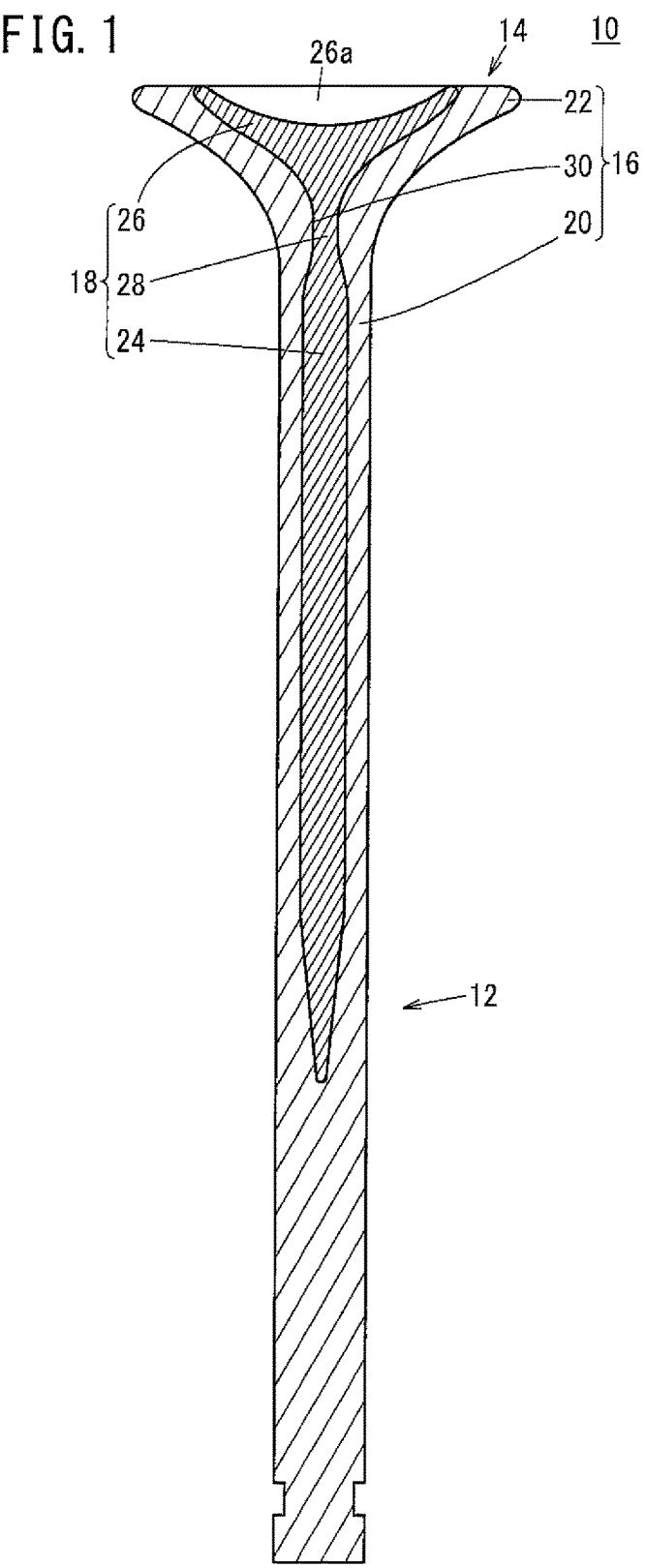
FIG. 1 is a cross sectional view schematically showing an engine valve according to an embodiment of the present invention.

As shown in FIG. 1, an engine valve 10 according to an embodiment of the present invention is used as an intake valve or an exhaust valve for opening/closing an intake port or an exhaust port (both not shown) of a combustion chamber of an internal combustion engine. The engine valve 10 includes a substantially cylindrical shaft part 12, and an umbrella part 14, a diameter of which is gradually expanded from one end of the shaft part 12 in a substantially inverse-tapered manner.

A portion of the engine valve 10 extending from the umbrella part 14 to a substantially central position of the shaft part 12 in the longitudinal direction is made up of a hollow portion of a valve body 16 and a core member 18 provided inside the valve body 16. Further, another portion of the engine valve 10 extending from the substantially central position to the other end of the shaft part 12 in the longitudinal direction is made up of a solid portion of the valve body 16.

The valve body 16 is made of, for example, heat resistant steel such as SUH35, SUH11, NCF, etc., or nickel alloy such as DY2, etc., since these materials are excellent in heat resistance property and oxidation resistance property, and also inexpensive. Further, the valve body 16 includes a shaft body 20 forming the shaft part 12, and an umbrella body 22, a diameter of which is gradually expanded from one end of the shaft body 20 in a substantially inverse-tapered manner to form the umbrella part 14.

The core member 18 is made of copper or copper alloy having a large heat conductivity and a large coefficient of thermal expansion in comparison with steel or nickel alloy. The core member 18 includes a shaft core 24 provided in the shaft body 20 to form the shaft part 12, and an umbrella core 26 provided in the umbrella body 22 to form the umbrella part 14. The umbrella core 26 has a large diameter in comparison with the shaft core 24. In the embodiment, an end surface 26a at one end of the umbrella core 26 has a circular arc shape depressed toward the shaft core 24 to increase its surface area. The end surface 26a and one end surface of the umbrella body 22 jointly form one end surface of the engine valve 10.

Further, the outer circumferential surface of the core member 18 is provided along the inner circumferential surface of the valve body 16. Since there is a difference of the coefficient of thermal expansion between the core member 18 and the valve body 16, when the temperature of the engine valve 10 is lower than the operating temperature of the internal combustion engine (hereinafter simply referred to as the operating temperature), a gap is formed at least in part between the outer circumferential surface of the core member 18 and the inner circumferential surface of the valve body 16. On the other hand, when the temperature of the engine valve 10 is the operating temperature or more, the outer circumferential surface of the core member 18 and the inner circumferential surface of the valve body 16 are placed in close contact with each other. As described above, since the diameter and the volume of the umbrella core 26 are larger than those of the shaft core 24, the size difference of the umbrella core 26 between before and after thermal expansion is accordingly large. Therefore, the above gap tends to be formed more easily between the inner circumferential surface of the umbrella body 22 and the outer circumferential surface of the umbrella core 26, than between the inner circumferential surface of the shaft body 20 and the outer circumferential surface of the shaft core 24.

Further, a neck (constricted portion) 28 is formed between the shaft core 24 and the umbrella core 26 by extrusion or press forming in the steps of producing the engine valve 10 described later. Further, an expansion 30 expanded along the neck 28 is formed on an inner wall of the valve body 16 between the shaft body 20 and the umbrella body 22. At temperature lower than the operating temperature, the outer diameter of portions of the core member 18 on both sides of the neck 28 in the axial direction is larger than the inner diameter of the expansion 30 of the valve body 16. Therefore, the core member 18 is held without coming off the valve body 16.

The engine valve 10 according to the embodiment of the present invention basically has the above structure. Next, a method of producing the engine valve 10 will be described with reference to FIGS. 2, 3A, 3B, and FIG. 4. As described below, the production method includes a billet forming step, a shaft part forming step, and an umbrella part forming step.

Figure 2:
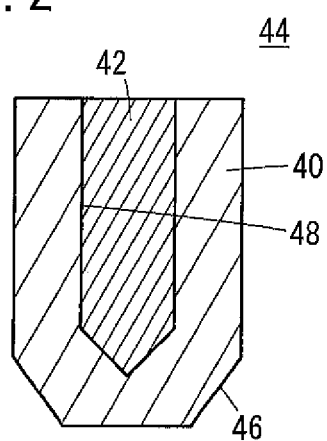
FIG. 2 is a view schematically showing a billet forming step in a method of producing the engine valve in FIG. 1.

In the billet forming step, as shown in FIG. 2, a billet 44 is formed by loading the inside of first material 40 with second material 42. The first material 40 is steel or nickel alloy, which is material of the valve body 16 described above. The second material 42 is copper or copper alloy, which is material of the core member 18. More specifically, in the billet forming step, firstly, a cylindrical member made of the above steel or nickel alloy is cut to have a predetermined size.

The cut cylindrical member is subjected to backward extrusion molding, e.g., using a punch having a predetermined shape, whereby a bottomed hole 48 is formed to thereby obtain the first material 40. The bottomed hole 48 is a shaft center part of a tapered portion 46 having a reduced diameter at a bottom surface thereof. Next, the second material 42 which has been processed into a shape corresponding to the bottomed hole 48 of the first material 40 is loaded into the bottomed hole 48. Thus, the billet 44 is obtained. At this time, the tapered front end of the second material 42 enters the tapered portion 46 for thereby carrying out center alignment (centering) of the first material 40 and the second material 42.

Figure 3A:
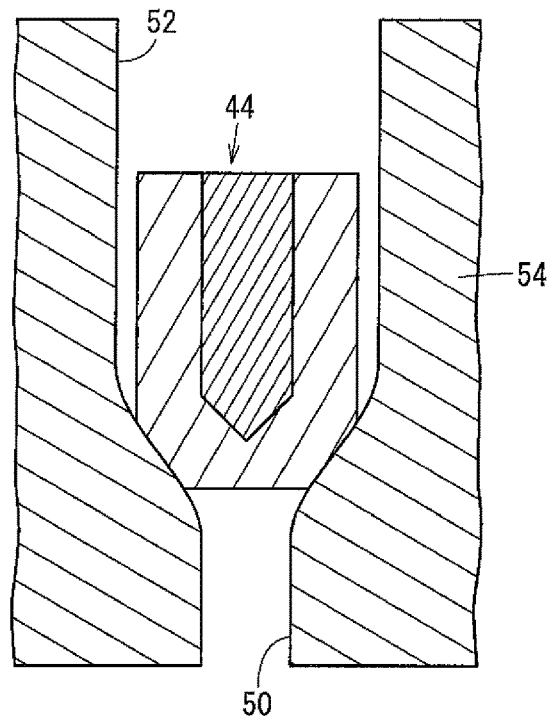
FIG. 3A is a view schematically showing a shaft part forming step.

In the shaft part forming step, extrusion molding is performed on the billet 44 in a warm temperature range or a hot temperature range at a temperature that is equal to or higher than the operating temperature of the internal combustion engine to thereby form the shaft part 12 where the shaft core 24 made of the second material 42 is provided inside the shaft body 20 made of the first material 40. More specifically, as shown in FIG. 3A, a first die 54 includes a narrowed portion 50 having an inner diameter corresponding to the outer diameter of the shaft part 12, and a large diameter portion 52 having an inner diameter corresponding to the outer diameter of the billet 44, and firstly, the billet 44 is placed in the large diameter portion 52 in a manner that the bottom surface side of the billet 44 faces toward the narrowed portion 50. At this time, for example, by heating the die to a temperature in a range of 900° C. to 1000° C., the billet 44 is heated to the operating temperature or more.

Figure 3B:
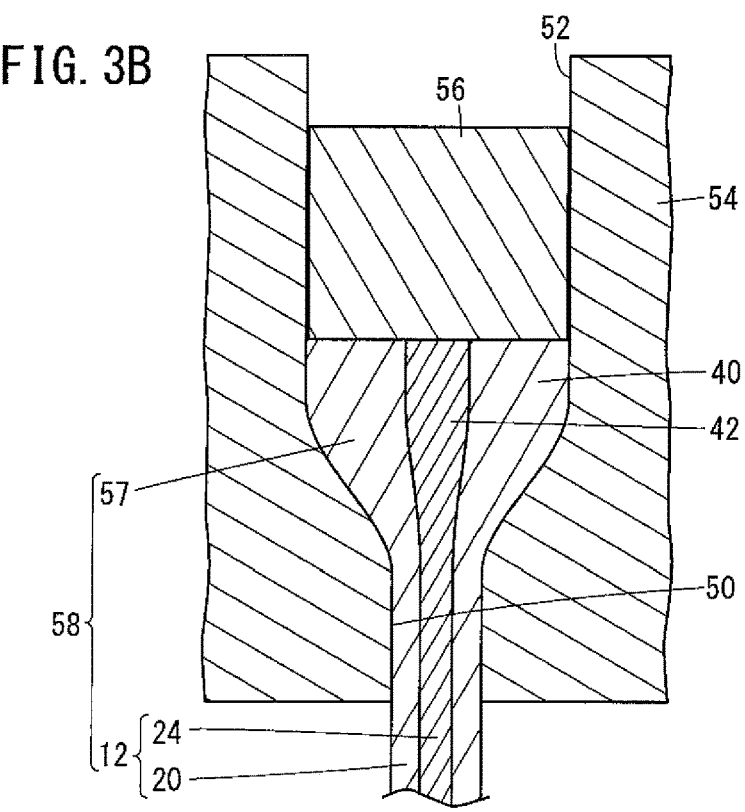
FIG. 3B is another view schematically showing the shaft part forming step.

Next, as shown in FIG. 3B, the billet 44 is pressed toward the narrowed portion 50 by the punch 56 to perform extrusion molding. Thus, the shaft body 20 and the shaft core 24 are molded integrally at the operating temperature or more to thereby form the shaft part 12. As a result, a preliminary molded body 58 including the shaft part 12 and a head part 57 having a diameter larger than that of the shaft part 12 is obtained.

Figure 4:
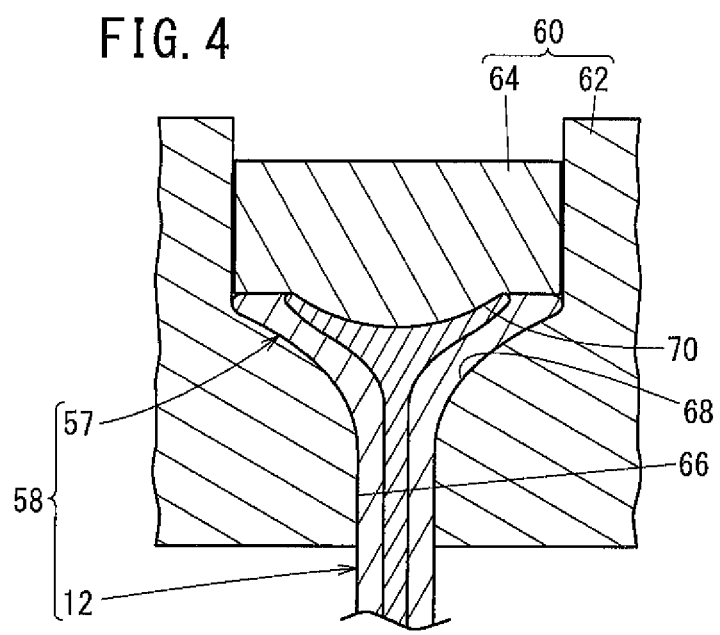
FIG. 4 is a view schematically showing an umbrella part forming step.

In the umbrella part forming step, firstly, the preliminary molded body 58 is taken out of the first die 54, and the preliminary molded body 58 is set in a second die 60 shown in FIG. 4. The second die 60 includes a lower die 62 and an upper die 64. The lower die 62 has a through hole 66 through which the shaft part 12 is inserted, and a cavity forming surface 68 corresponding to a shape of the outer circumferential surface of the umbrella part 14. The upper die 64 has a convex cavity forming surface 70 corresponding to a shape of one end surface of the umbrella part 14.

The shaft part 12 of the preliminary molded body 58 is inserted into the through hole 66 of the lower die 62, and the head part 57 thereof is placed on the cavity forming surface 68 of the lower die 62. In this state, the upper die 64 is pressed against the head part 57 to perform upset molding, whereby the head part 57 is deformed plastically. In this manner, it is possible to form the umbrella part 14 where the umbrella core 26 is provided inside the umbrella body 22. It should be noted that the temperature of the preliminary molded body 58 is at, for example, about 800° C., due to the processing heat or the like of extrusion molding in the above shaft part forming step. Therefore, utilizing the residual heat, it is possible to also perform the umbrella part forming step at the operating temperature or more.

As a result, the engine valve 10 having the umbrella part 14 formed at one end of the shaft part 12 is obtained. That is, the engine valve 10 can be obtained by molding the valve body 16 and the core member 18 integrally. Further, in the engine valve 10 obtained in this manner, since the expansion 30 and the neck 28 are formed respectively in the valve body 16 and the core member 18, the valve body 16 and the core member 18 are combined together without any detachment from each other.

As described above, the engine valve 10 includes the core member 18 made of copper or copper alloy having a large heat conductivity to thereby exhibit excellent heat radiation performance. Therefore, for example, the engine valve 10 can be applied suitably to an internal combustion engine where a displacement thereof is reduced by utilizing a supercharger (downsized internal combustion engine). In this case, even if the combustion chamber tends to be hot due to supercharging, since the heat in the combustion chamber can be transmitted and radiated to the outside of the combustion chamber quickly through the engine valve 10, it is possible to effectively suppress knocking or the like due to preignition. Further, since the engine valve 10 has excellent heat radiation performance as described above, in particular, the engine valve 10 can be used suitably as an exhaust valve which tends to become hot in comparison with the intake valve.

Since the core member 18 of the engine valve 10 is made of copper or copper alloy having ductility higher than that of aluminum, magnesium, etc., it is easy to integrally mold the valve body 16 and the core member 18 for thereby producing the engine valve 10. That is, at the time of producing the engine valve 10, it is not required to perform laborious steps, such as loading the core member into the valve body formed beforehand into a hollow shape by precision cutting work, etc. Further, there is no need to use water-reactive substance such as sodium. Therefore, in comparison with the case of the engine valve having the core member 18 made of aluminum, magnesium, sodium, etc., it is possible to obtain the engine valve 10 efficiently at low cost.

Further, as described above, in the engine valve 10, since the shaft part 12 and the umbrella part 14 are formed at the operating temperature or more, dimensions of the valve body 16 and the core member 18 are set in a manner that the valve body 16 and the core member 18 contact each other tightly at the operating temperature. Therefore, a gap is formed at least in part between the valve body 16 and the core member 18 at temperature lower than the operating temperature.

Thus, before the internal combustion engine reaches the operating temperature, since a heat insulating portion is formed and present between the valve body 16 and the core member 18 by the air in the gap, it is possible to decrease radiation of the heat from of the engine valve 10. In the structure, radiation of the heat from the combustion chamber through the engine valve 10 is suppressed, and it is possible to raise the temperature of the internal combustion engine to the operating temperature quickly.

After the internal combustion engine reaches the operating temperature, since good heat transmission is generated between the valve body 16 and the core member 18 that are brought into close contact with each other, it is possible to increase radiation of the heat from the engine valve 10. Thus, heat in the combustion chamber can be radiated effectively through the engine valve 10, and further increase in the temperature can be suppressed.

As described above, since it is possible to change heat transmission in the engine valve 10 depending on the temperature of the internal combustion engine, it is possible to improve the performance of starting operation of the internal combustion engine, and suppress knocking, etc. due to preignition.

The present invention is not limited particularly to the above described embodiment, and various modifications can be made without deviating from the scope of the present invention.

Figure 5A:
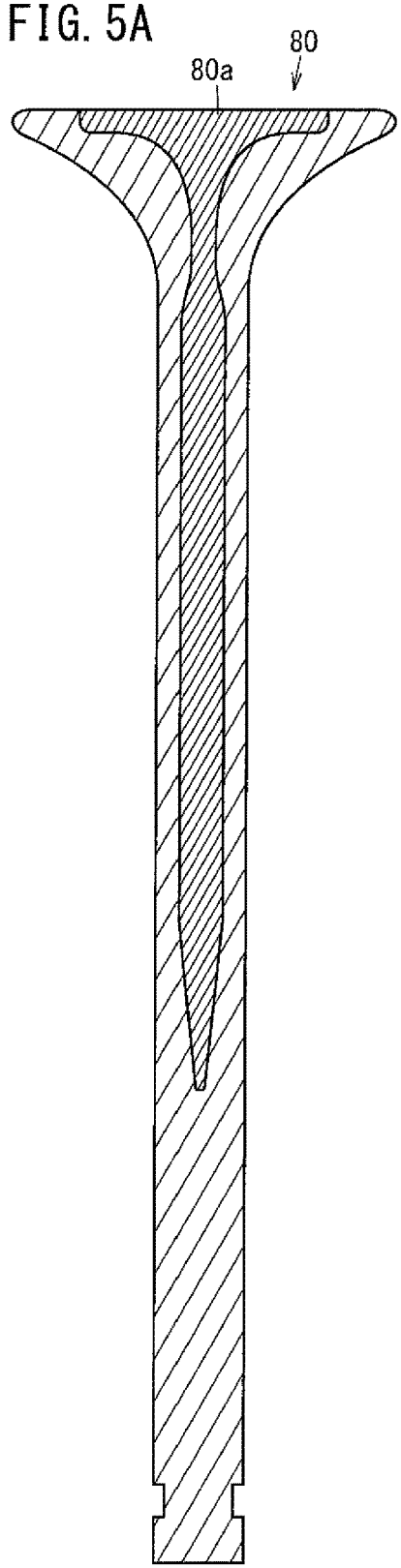
FIG. 5A is a cross sectional view schematically showing an engine valve according to another embodiment.

For example, in the engine valve 10 according to the embodiment of the present invention, the end surface 26a at one end of the umbrella core 26 is formed in a circular arc shape depressed toward the shaft core 24. However, the present invention is not limited in this respect. For example, as in the case of an engine valve 80 shown in FIG. 5A, a planar end surface 80a may be provided at one end of the umbrella core 26. The constituent elements shown in FIG. 5A that have identical or similar functions and effects as those shown FIG. 1 are labeled with the same reference numerals, and detailed description thereof is omitted.

In the case of obtaining the engine valve 80 of this type, for example, at the time of plastically deforming the preliminary molded body 58 using the second die 60 in the umbrella part forming step, an upper die 64 having a flat cavity forming surface instead of the convex cavity forming surface may be used.

Figure 5B:
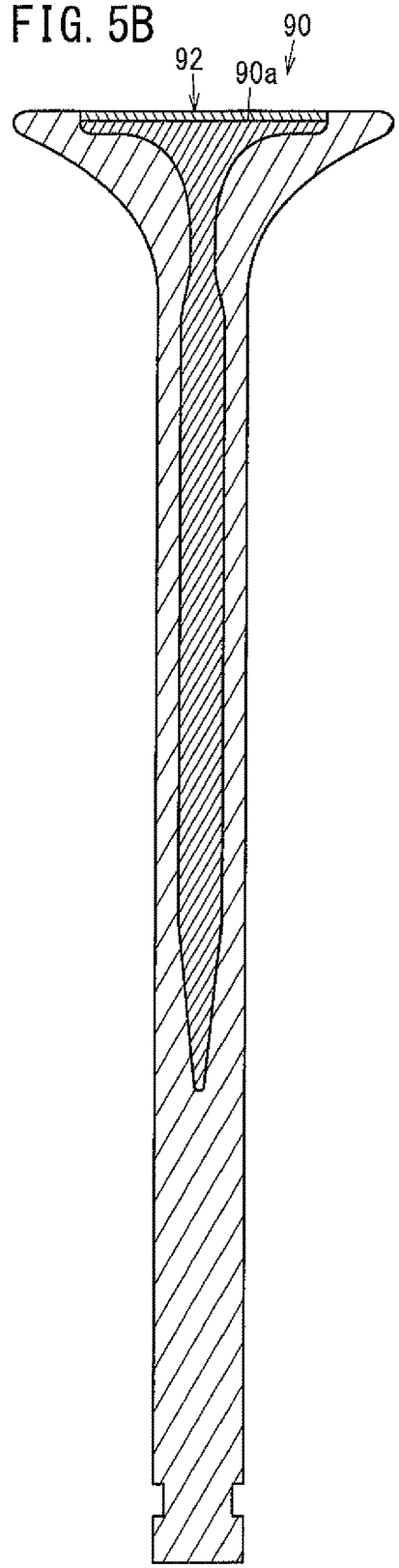
FIG. 5B is a cross sectional view schematically showing an engine valve according to still another embodiment.

Further, in the engine valve 10 according to the above embodiment, the end surface 26a of the umbrella core 26 and the one-end surface of the umbrella body 22 jointly form the one end surface of the engine valve 10. However, the present invention is not limited in this respect. For example, as in the case of an engine valve 90 shown in FIG. 5B, an end surface 90a at one end of the umbrella core 26 may be covered by a lid 92. For example, the lid 92 may be made of steel or nickel alloy as in the valve body 16.

In the case of obtaining the engine valve 90 of this type, for example, third material (not shown) of steel or nickel alloy, which is a material for the lid 92, is placed on the opening side of the bottomed hole 48 of the first material 40 where the second material 42 is loaded. In this state, by the punch 56, the third material and the billet 44 may be pressed toward the narrowed portion 50 to perform extrusion molding. Since the lid 92 made of steel or nickel alloy is provided, in the engine valve 90, there is no possibility of occurrence of erosion of the core member 18 or no possibility of accumulation of carbon, sludge, etc., between the valve body 16 and the core member 18. Therefore, it is possible to improve the durability. Further, by changing the thickness of the lid 92, it is possible to adjust the operating temperature of the internal combustion engine.

Further, in the engine valve 10 according to the embodiment of the present invention, the portion of the engine valve 10 extending from the umbrella part 14 to the substantially central position of the shaft part 12 in the longitudinal direction is made up of the valve body 16 and the core member 18 provided inside the valve body 16. However, the present invention is not limited in this respect. For example, the entirety of the engine valve 10 including the umbrella part 14 and the shaft part 12 in the longitudinal direction may be made up of the valve body 16 and the core member 18. Alternatively, in the shaft part 12, the length of a portion made up of the valve body 16 and the core member 18 may be shorter than the distance between the umbrella part 14 and the substantially central position of the shaft part 12 in the longitudinal direction.

What is claimed is:

1. An engine valve for opening and closing an intake port or an exhaust port of a combustion chamber of an internal combustion engine, the engine valve including a shaft part and an umbrella part formed at one end of the shaft part,
    wherein at least a portion of the engine valve that extends from the umbrella part to a position on the shaft part in a longitudinal direction thereof comprises:
    a valve body made of steel or nickel alloy, wherein the valve body includes a shaft body forming the shaft part and an umbrella body forming the umbrella part;
    a core member made of copper or copper alloy and provided inside the valve body, wherein the core member includes a shaft core provided in the shaft body, an umbrella core provided in the umbrella body, and a neck formed between the shaft core and the umbrella core,
    wherein
    the valve body further includes an expansion expanded on an inner wall of the valve body between the shaft body and the umbrella body along the neck of the core member, and
    an outer diameter of the core member is larger than an inner diameter of the expansion of the valve body on both sides of the neck in an axial direction of the engine valve when the outer diameter of the core member and the inner diameter of the expansion of the valve body are measured at same axial points in the axial direction of the engine valve.

2. The engine valve according to claim 1, wherein a gap is formed at least in part between the valve body and the core member at temperature lower than an operating temperature of the internal combustion engine, and
    the valve body and the core member is in close contact with each other due to thermal expansion at the operating temperature or more.

3. A method of producing an engine valve for opening and closing an intake port or an exhaust port of a combustion chamber of an internal combustion engine, the engine valve including a shaft part and an umbrella part formed at one end of the shaft part,
    the method comprising:
    a billet forming step of forming a billet by loading an inside of first material of steel or nickel alloy with second material of copper or copper alloy;
    a shaft part forming step of extruding the billet in a warm temperature range or a hot temperature range at a temperature equal to or higher than an operating temperature of the internal combustion engine to thereby form the shaft part where a core member made of the second material is provided inside a valve body made of the first material; and
    an umbrella part forming step of plastically deforming a portion of the billet other than the shaft part to thereby form the umbrella part where the core member is provided inside the valve body;
    wherein, following the umbrella part forming step, the valve body includes a shaft body forming the shaft part and an umbrella body forming the umbrella part, the core member includes a shaft core provided in the shaft body, an umbrella core provided in the umbrella body, and a neck formed between the shaft core and the umbrella core, the valve body further includes an expansion expanded on an inner wall of the valve body between the shaft body and the umbrella body along the neck of the core member, and an outer diameter of the core member is larger than an inner diameter of the expansion of the valve body on both sides of the neck in an axial direction of the engine valve when the outer diameter of the core member and the inner diameter of the expansion of the valve body are measured at same axial points in the axial direction of the engine valve.

* * * * *